United States Patent
Clark et al.

(10) Patent No.: US 7,824,623 B2
(45) Date of Patent: *Nov. 2, 2010

(54) MULTIFUNCTIONAL VACUUM MANIFOLD

(75) Inventors: Phillip Clark, Wakefield, MA (US);
Kurt E. Greenizen, Haverhill, MA
(US); John Doyle, Kensington, NH (US)

(73) Assignee: Millipore Corporation, Billerica, MA (US)

( * ) Notice: Subject to any disclaimer, the term of this patent is extended or adjusted under 35 U.S.C. 154(b) by 278 days.

This patent is subject to a terminal disclaimer.

(21) Appl. No.: 10/602,426

(22) Filed: Jun. 24, 2003

(65) Prior Publication Data

US 2004/0265186 A1    Dec. 30, 2004

(51) Int. Cl.
B01L 99/00   (2010.01)
(52) U.S. Cl. .................. 422/101; 422/100; 422/102; 436/177; 436/178
(58) Field of Classification Search ............. 422/58, 422/99, 101, 129, 130, 131; 436/174, 177, 436/178; 210/224, 227, 231, 294, 295, 406
See application file for complete search history.

(56) References Cited

U.S. PATENT DOCUMENTS

| | | | |
|---|---|---|---|
| 4,734,192 A | 3/1988 | Champion et al. | 210/335 |
| 4,927,604 A | 5/1990 | Mathus et al. | |
| 5,009,780 A | 4/1991 | Sarrasin | 210/238 |
| 5,227,137 A | 7/1993 | Monti et al. | |
| 5,464,541 A * | 11/1995 | Aysta et al. | 210/767 |
| 5,498,545 A * | 3/1996 | Vestal | 436/47 |
| 5,846,493 A * | 12/1998 | Bankier et al. | 422/101 |
| 6,048,457 A | 4/2000 | Kopaciewicz et al. | 210/321.6 |
| 6,054,100 A * | 4/2000 | Stanchfield et al. | 422/102 |
| 6,159,368 A * | 12/2000 | Moring et al. | 210/321.75 |
| 6,200,474 B1 | 3/2001 | Kopaciewicz et al. | 210/321.6 |
| 6,451,261 B1 | 9/2002 | Reed et al. | |
| 6,464,942 B2 | 10/2002 | Coffman et al. | 422/100 |
| 6,592,826 B1 * | 7/2003 | Bloecker et al. | 422/101 |
| 6,852,289 B2 | 2/2005 | Gordon et al. | |
| 6,869,572 B1 * | 3/2005 | Kopaciewicz et al. | 422/101 |
| 6,893,562 B2 | 5/2005 | Busnach et al. | |
| 7,405,083 B2 | 7/2008 | Chen | |
| 2003/0223912 A1 | 12/2003 | Knecht et al. | |
| 2004/0228772 A1 | 11/2004 | Chen et al. | |
| 2006/0013736 A1 | 1/2006 | Blok et al. | |
| 2006/0057032 A1 | 3/2006 | Blok et al. | |
| 2009/0023897 A1 | 1/2009 | Chen | |

FOREIGN PATENT DOCUMENTS

EP    0408940    1/1991

(Continued)

*Primary Examiner*—Jill Warden
*Assistant Examiner*—Dwayne K Handy

(57) ABSTRACT

A laboratory device design particularly for a multiplate format that includes a manifold wherein the position of the plate is not a function of gasket compression or vacuum rate applied. In one embodiment, the device has a modular design, wherein removable inserts with different functionalities can be positioned between a base component and a collar component. The particular inserts chosen depend on the desired sample preparation or assay to be carried out. The inserts are stacked and are positioned between the base and collar as a unit, so that the stack within the manifold does not move during evacuation of the vacuum chamber. The consistent position of the multiplate facilitates using vacuum sample processing with automated liquid handlers.

38 Claims, 11 Drawing Sheets

FOREIGN PATENT DOCUMENTS

| | | |
|---|---|---|
| EP | 1074292 | 2/2001 |
| EP | 1358936 | 11/2003 |
| JP | 7-5109 | 2/1995 |
| JP | 10510501 T | 10/1998 |
| JP | 2004-163396 | 6/2004 |
| JP | 2004-354376 | 12/2004 |
| JP | 2005-523009 | 8/2005 |
| WO | WO97/10055 | 3/1997 |
| WO | WO99/20396 | 4/1999 |
| WO | WO01/06003 | 1/2001 |

* cited by examiner

MULTIFUNCTIONAL VACUUM MANIFOLD

BACKGROUND OF THE INVENTION

Test plates for chemical or biochemical analyses, which contain a plurality of individual wells or reaction chambers, are well-known laboratory tools. Such devices have been employed for a broad variety of purposes and assays, and are illustrated in U.S. Pat. Nos. 4,734,192 and 5,009,780, for example. Microporous membrane filters and filtration devices containing the same have become particularly useful with many of the recently developed cell and tissue culture techniques and assays, especially in the fields of bacteriology and immunology. Multiwell plates, used in assays, often utilize a vacuum applied to the underside of the membrane as the driving force to generate fluid flow through the membrane. The microplate has been used as a convenient format for plate processing such as pipetting, washing, shaking, detecting, storing, etc. A variety of assays have been successfully formatted using multiwell filter plates with vacuum driven follow-through. Applications range from Cell Based assays, genomics and proteomics sample prep to immuno-assays.

An example of a protein digestion sample process may include the following steps:
1. Deposit the protein sample in the wells with the digestion enzymes.
2. Bind or capture the digested protein in or on the filter structure.
3. A series of sample washes where the solutions are transferred to waste by vacuum.
4. Solvent elution to recover the concentrated sample.

Another filter plate application used for a Genomoic Sequencing Reaction Clean-up may include the following steps:
1. Deposit the sample into the wells and concentrate product onto the membrane surface by vacuum filtration to waste.
2. A series of sample washes where the solutions are transferred to waste by vacuum. Repeated and then filter to dryness.
3. Re-suspend the sample on the membrane and aspirate off the re-suspended sample from the membrane surface.

Washing to waste is easily accomplished with virtually any of the conventional manifolds available. During a wash step, a relatively large volume (greater than 50 µl) of aqueous solution is added to the wells and drawn to waste. The orientation of the plate is not critical when adding a large volume of liquid, as long as the transfer pipette or other device is able to access the well opening. However with the Protein Digestion example, the elution volumes are relatively small (less than 15 µl) and can be as low as about 1 µl. This small volume needs to be deposited directly on the filter structure in the well to insure the solvent is drawn through the structure for complete elution of the sample. With the other example, Sequencing Reaction Clean-up, the final concentrated sample is between 10-20 µl and must be aspirated off the membrane without damaging the membrane surface.

Many of these and other protocols require the addition of small accurate liquid volumes. When using filter bottom plates the performance benefit is achieved because of the follow-through nature of the filter. To achieve flow through the filter a pressure differential is applied. When using automated equipment, vacuum filtration is the preferred method because of its convenience and safety. To filter by vacuum, many manufacturers provide a vacuum manifold for their products and equipment. Still, accurate liquid transfer is not possible on the deck of a conventional liquid handler, because the position of the plate in the Z-direction can vary during use. Indeed, all of the standard manifolds available today use a compressible gasket material to seal the filter plate, and during the evacuation of the vacuum chamber in the manifold, the plate moves as the gasket is compressed. The amount of plate movement varies, depending in part upon the durometer of the gasket used and the vacuum pressure that is applied. The amount of movement is too great or variable to be able to program a liquid handling robot to account for the movement, making successful, reproducible automated transfer difficult or impossible. Similar problems arise with the Sequencing clean-up where the small volume is aspirated off the surface of the membrane. If the position of the membrane varies then it is not possible to program the automated equipment to aspirate off the surface of the membrane without potentially damaging the membrane surface.

Additionally, to insure quantitative transfer of filtrate from a 384-well filter plate into a collection plate, the spouts must be as close to the collection plate openings as possible. The available manifolds have a gasket sealing to the underside of the filter plate, and thus the only way to use these manifolds to achieve quality transfers is to have the spouts extend below the plate flange and into the wells of the collection plate. However, in such a design, the spouts are exposed and are thus prone to damage and/or contamination.

It is therefore an object of the present invention to provide a vacuum manifold assembly that is readily adapted to automation protocols.

It is another object of the present invention to provide a vacuum manifold assembly that fixes the position of a sample processing device, such as a multiwell plate, regardless of the vacuum applied.

It is a further object of the present invention to provide a vacuum manifold assembly with features that enable quantitative filtrate transfer to a collection well when used with multiwell plates with dense arrays of wells.

It is another object of the present invention to provide a vacuum manifold assembly that enables direct transfer on a analytical device such as and MALDI target.

It is still another object of the present invention to provide a vacuum manifold assembly that is modular and adaptable to a variety of applications.

SUMMARY OF THE INVENTION

The problems of the prior art have been overcome by the present invention, which provides a laboratory device design particularly for a multiwell plate format that includes a manifold wherein the position of the plate is not a function of gasket compression or vacuum rate applied. The design also can be used with a single well device, particularly when small volume liquid processing applies. In one embodiment of the present invention, the device has a modular design, wherein removable inserts with different functionalities can be positioned between a base component and a collar component. The particular inserts chosen depend on the desired sample preparation or assay to be carried out. The inserts are stacked and are positioned between the base and collar as a unit, so variation in height of the stack within the manifold is as a unit and is constant; i.e., there is no relative movement of one insert with respect to another insert, even upon evacuation of the vacuum chamber. Therefore, the automated liquid handlers can be programmed to position the pipette tip in close proximity to the well bottom or filter surface for small volume dispensing or aspirating.

DETAILED DESCRIPTION OF THE INVENTION

Figure 1:
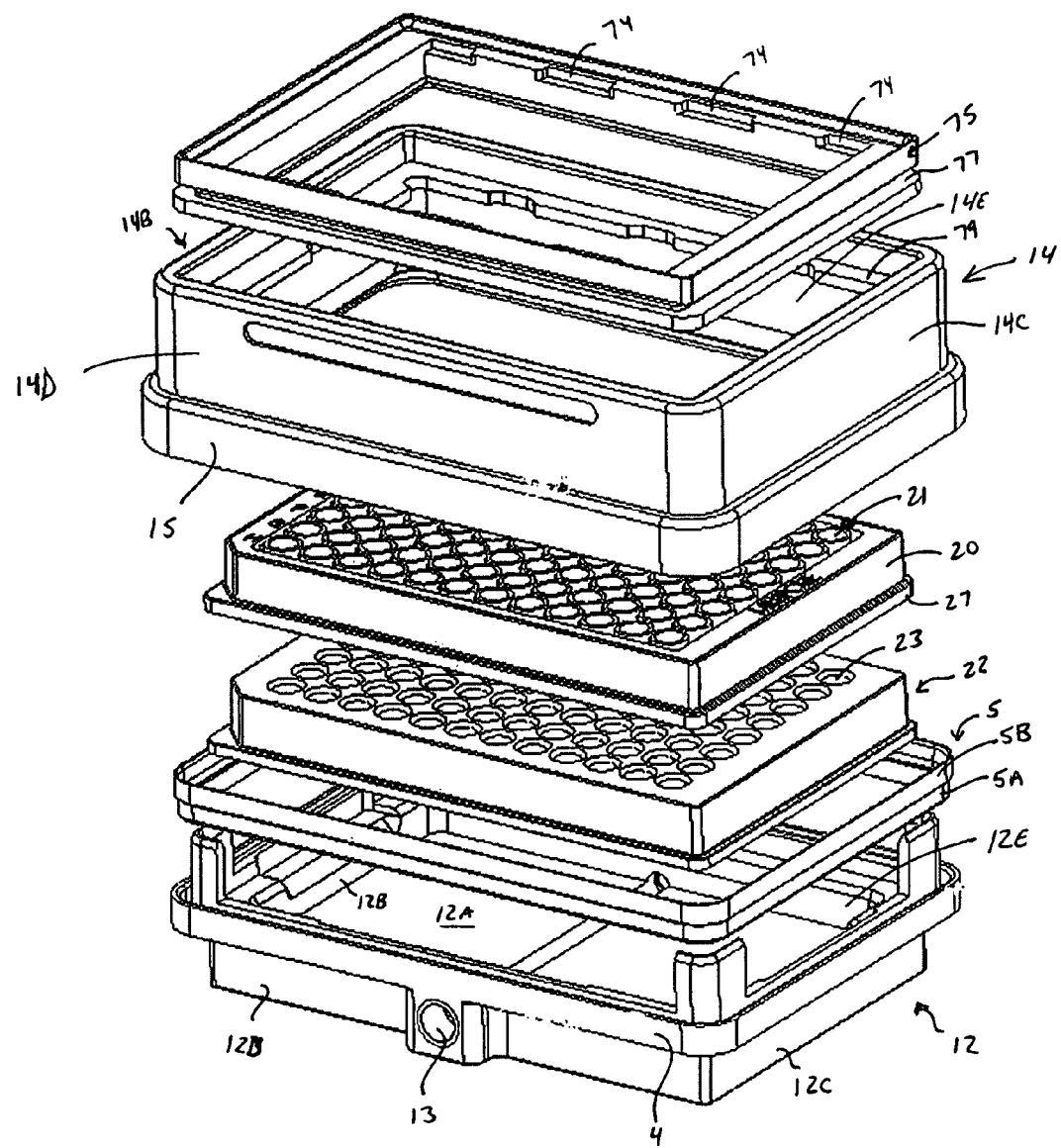
FIG. 1 is an exploded view of a manifold assembly in accordance with an embodiment of the present invention.

There are two common components in the vacuum manifold assembly in accordance with the present invention, regardless of the application. With reference to FIG. 1, the common components are a base 12 and a collar 14, together sized and configured to contain sample processing components. The base 12 includes a port 13 for communication with a driving force, such as a source of vacuum, preferably a vacuum pump. The base 12 also includes a bottom 12A and one or more side walls upstanding therefrom. In the rectangular embodiment shown, there are four connecting side walls, namely, opposite side walls 12B and 12C, and opposite side walls 12D and 12E. The base includes an outer peripheral flange 4 that in combination with an inner peripheral portion of the side walls, forms a peripheral groove 6 (FIG. 8) that receives gasket 5. Preferably the gasket 5 has a lower peripheral portion 5A that seats in the groove 6 and a top peripheral portion 5B that extends above the groove 6. The upper portion 5B is skewed outwardly so that when the lower portion 5A of the gasket is in place in the groove 6, the upper portion 5B it is aligned or substantially aligned with the outer surface of the side walls 12B, 12C, 12D and 12E. The gasket 5 thus creates a seal between the base 12 and the component in contact with the gasket 5, such as the collar 14, as discussed in greater detail below. Other configurations are within the scope of the invention, provided a seal is created.

Figure 2:
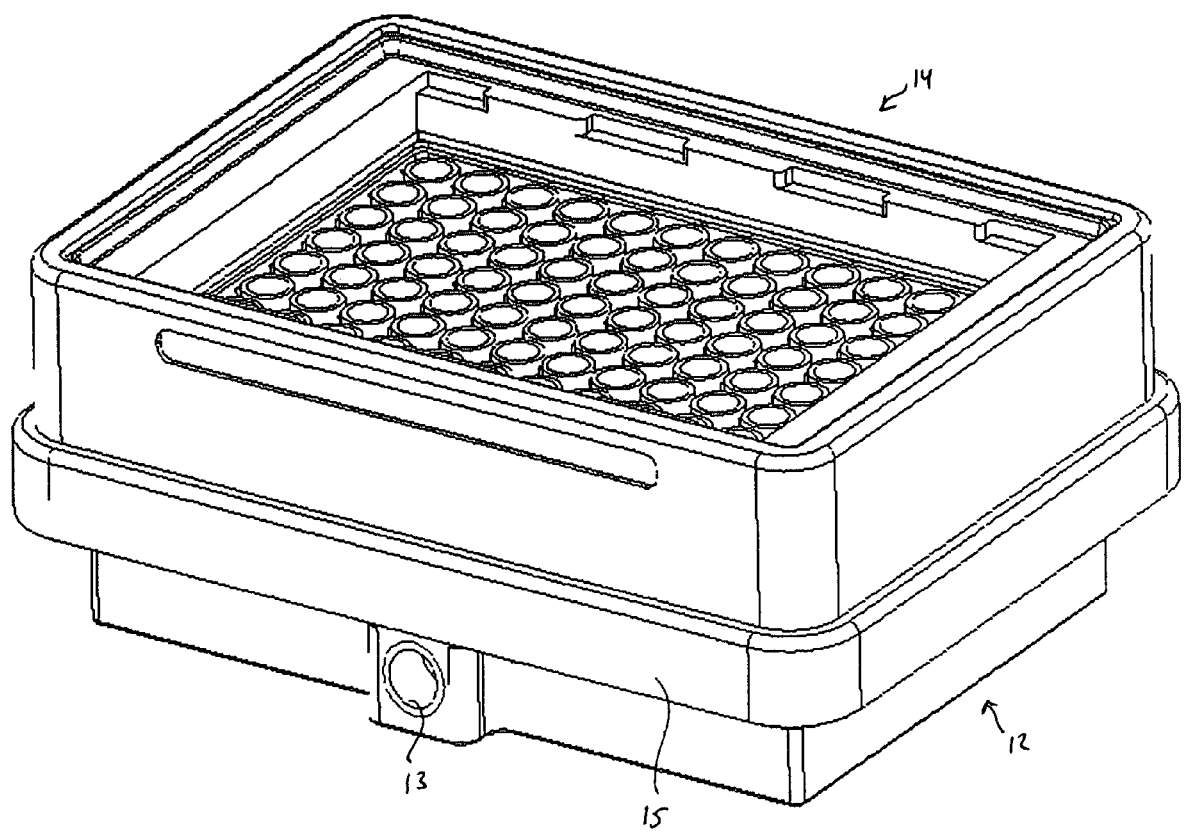
FIG. 2 is a perspective view of the manifold assembly shown in an assembled condition.

In the embodiment shown, collar 14 also has four lateral walls, namely, opposite walls 14B, 14C and opposite walls 14D, 14E. The lateral walls must extend downwardly (and/or the side walls of the base 12 must extend upwardly) a distance sufficient to accommodate the components that are positioned between the collar 14 and the base 12. The vertical length of these lateral walls (and/or the side walls) thus can vary depending on the application. A skirt 15 preferably is formed along the bottom periphery of the lateral walls such that the skirt 15 positions over the peripheral portion 4 of the base 12 in sealing relationship when in the assembled condition, as seen in FIG. 2. A gasket 75 is attached to the inner, top surface of the collar 14 around the top opening and is designed to seal against the top surface of a component disposed against the collar, as discussed in greater detail below. The gasket 75 preferably includes a peripheral slot 77 that mates with a corresponding inner peripheral rib 79 in the collar 14. A plurality of rectangular steps 74 may also be provided in the gasket 75 to mate with support insert 37 shown in FIG. 5.

Figure 9:
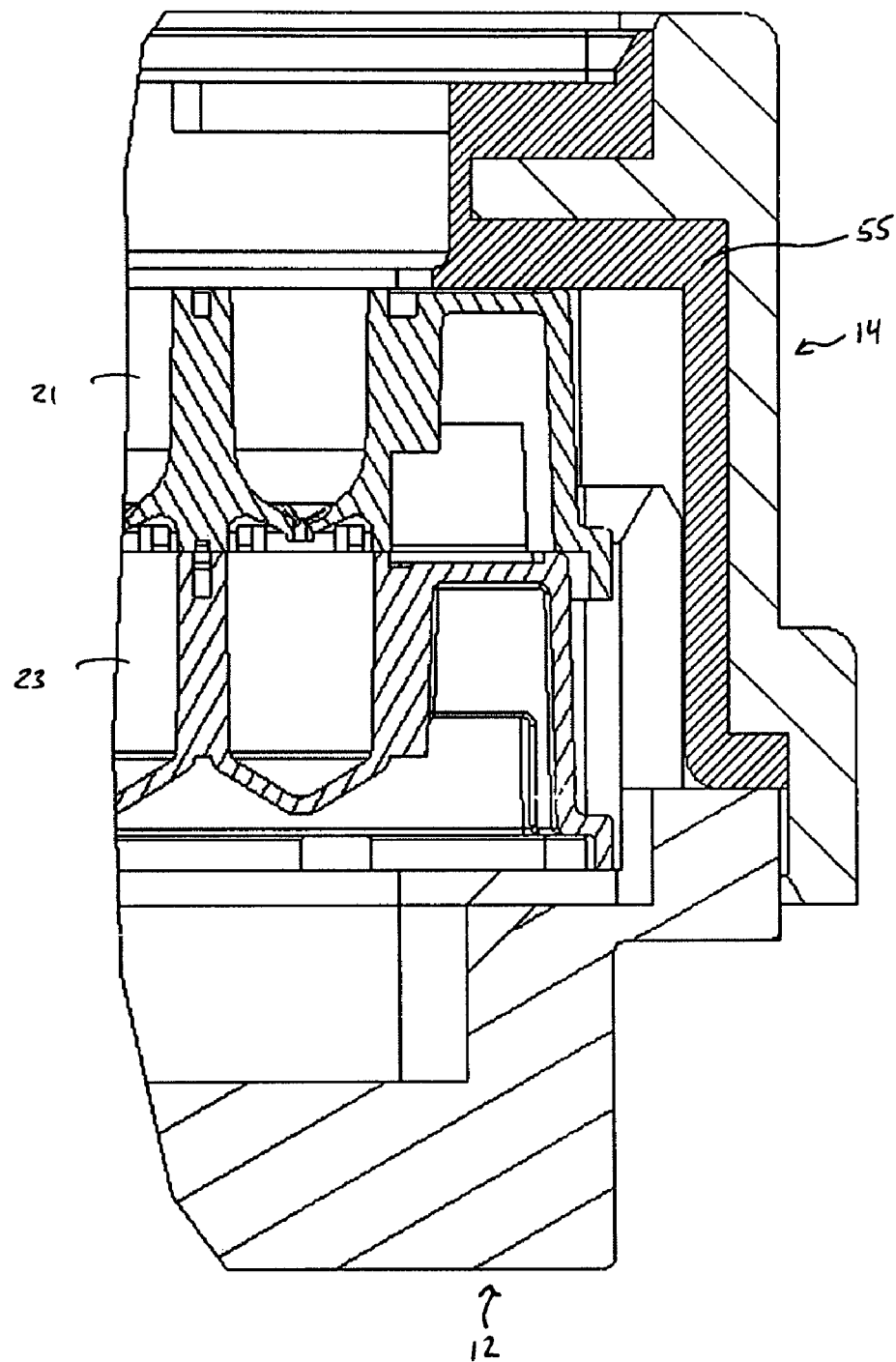
FIG. 9 is a cross-sectional view of the manifold assembly with a unitary common gasket used for sealing.
Figure 10:
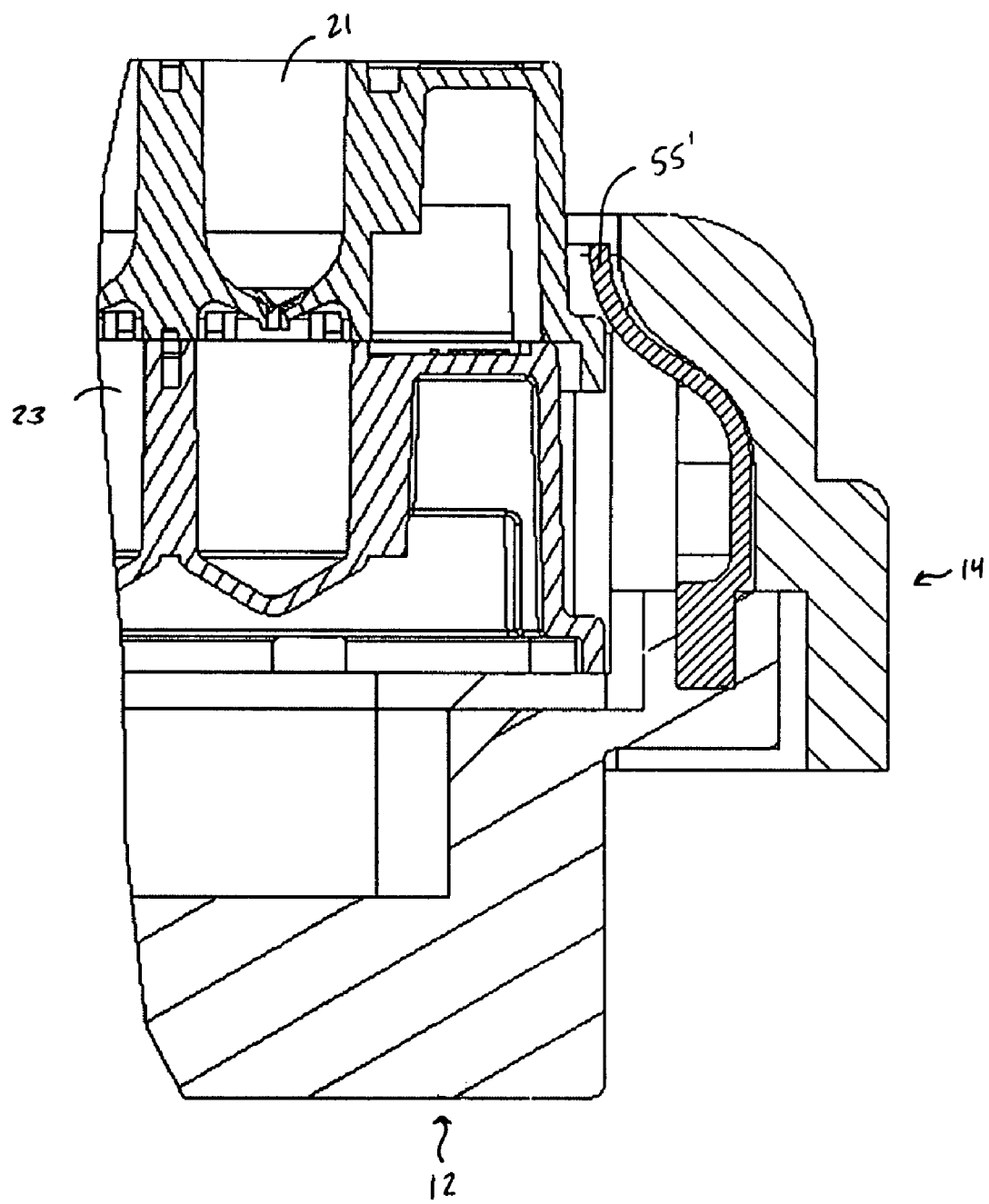
FIG. 10 is a cross-sectional view of the manifold assembly with a unitary flexible gasket used for sealing.

It will be understood by those skilled in the art that the invention is not limited to any particular sealing means. For example, instead of separate gaskets that seal the collar and the base, a single unitary gasket 55 or flexible unitary gasket 55' could be used, such as is shown in FIGS. 9 and 10. It also will be understood by those skilled in the art that the invention is not limited to any particular sample processing device; devices that enable filtration, collection, digestion of protein by enzymes, wash steps, solvent elution, MALDO TOF, sequencing, PCR clean-up, cell growth, assaying, etc. can be used in the present invention. Depending upon the application, generally the sample processing components are molded parts and are solvent compatible. The sample processing devices include single well and multiwell devices. Metals, polyolefins and filled nylon are suitable materials of construction. Rarely used components can be machined. In the embodiment shown in FIG. 1, the sample processing devices positioned between the base 12 and collar 14 are a filter plate 20 and a collection plate 22, both preferably being made of polyethylene, and thus the length of the lateral walls of collar 14 (and/or the side walls of the base 12) is made sufficient to accommodate these components when assembled to the base 12. The filter plate 20 and the collection plate 22 are configured for proper stacking and alignment as is known in the art.

The filter plate 20 includes a plurality of wells 21, preferably arranged in an ordered two-dimensional array. Although a 96-well plate array is illustrated, those skilled in the art will appreciate that the number of wells is not limited to 96; standard formats with 384 or fewer or more wells are within the scope of the present invention. The wells are preferably cylindrical with fluid-impermeable walls, and have a width and depth according to the desired use and amount of contents to be sampled. The wells are preferably interconnected and arranged in a uniform array, with uniform depths so that the tops and bottoms of the wells are planar or substantially planar. Preferably the array of wells comprises parallel rows of wells and parallel columns of wells, such that each well not situated on the outer perimeter of the plate is surrounded by eight other wells. Preferably the plate 20 is generally rectangular, and is stacked on top of a collection plate 22. The filter plate 20 can be of a conventional design.

Each of the wells 21 of the filter plate 20 includes a membrane or porous structure (not shown) sealed to or positioned in the well. The sealing can be accomplished by any suitable means, including heat-sealing, sealing with ultrasonics, solvents, adhesives, by diffusion bonding, compression such as by a ring or skive, etc. The type of membrane suitable is not particularly limited, and by way of example can include nitrocellulose, cellulose acetate, polycarbonate, polypropylene and PVDF microporous membranes, or ultrafiltration membranes such as those made from polysulfone, PVDF, cellulose or the like. Additionally, materials also include depth filters, nonwovens, woven meshes and the like or combinations thereof, depending upon the application, or the membrane can be cast-in-place as disclosed in U.S. Pat. Nos. 6,048,457 and 6,200,474, the disclosures of which are hereby incorporated by reference. A single membrane covering all of the wells could be used, or each well can contain or be associated with its own membrane that can be the same or different from the membrane associated with one or more of the other wells. Each such membrane support is preferably coextensive with the bottom of its respective well.

Each of the wells 21 of the filter plate 20 also includes an outlet, preferably in the form of a spout that is centrally located with respect to each well 21 and preferably does not extend below the plate skirt.

The collection plate 22 preferably is also generally rectangular, and includes a plurality of openings 23. Each opening 23 corresponds to a well 21 of the filtration plate, such that when in the assembled condition, each well 21 of the filter plate 20 is registered with and thus in fluid communication with a respective opening 23 of the collection plate 22. Each opening 23 terminates in a bottom. The collection plate 22 can be of a conventional design.

The filter plate 20 has a lower peripheral skirt 27 that allows it to be stacked over the collection plate 22. When the filter plate 20 is stacked over the collection plate 22 as in the FIG. 1 embodiment, proper alignment is ensures, such that each of the spouts is positioned directly over and in close proximity to a respective opening 23 in the collection plate 22. The proximity and alignment of each spout with a respective opening prevents cross-talk among neighboring wells. The stacked plates are positioned inside the base 12 as an integral unit. The collar 14 is positioned over the two plates and sits against the base flange gasket 5, which seals the base 12 to the collar 14. This also positions the collar gasket 75 on the top perimeter edge of the filter plate 20. When vacuum is applied to the manifold, the collar 14 is the only moving component. As additional vacuum is applied, the vacuum causes the collar 14 to compress both gaskets. However, the filter plate 20 and collection plate 21 remain fixed in the loaded position because they make up a solid stack assembly that includes the base 12, the collection plate 21 and the filter plate 20 that is independent of and not influenced by the relative movement of the collar 14. Thus, the stack height of the filter plate and collection plate remains constant. A liquid handler can be programmed to dispense onto the membrane in the filter plate 20, regardless of whether the assembly is under vacuum, since the stack height is not changed by the application of vacuum. The assembly, therefore, is readily adaptable to automation protocols and allows for quantitative filtrate transfer.

Figure 3:
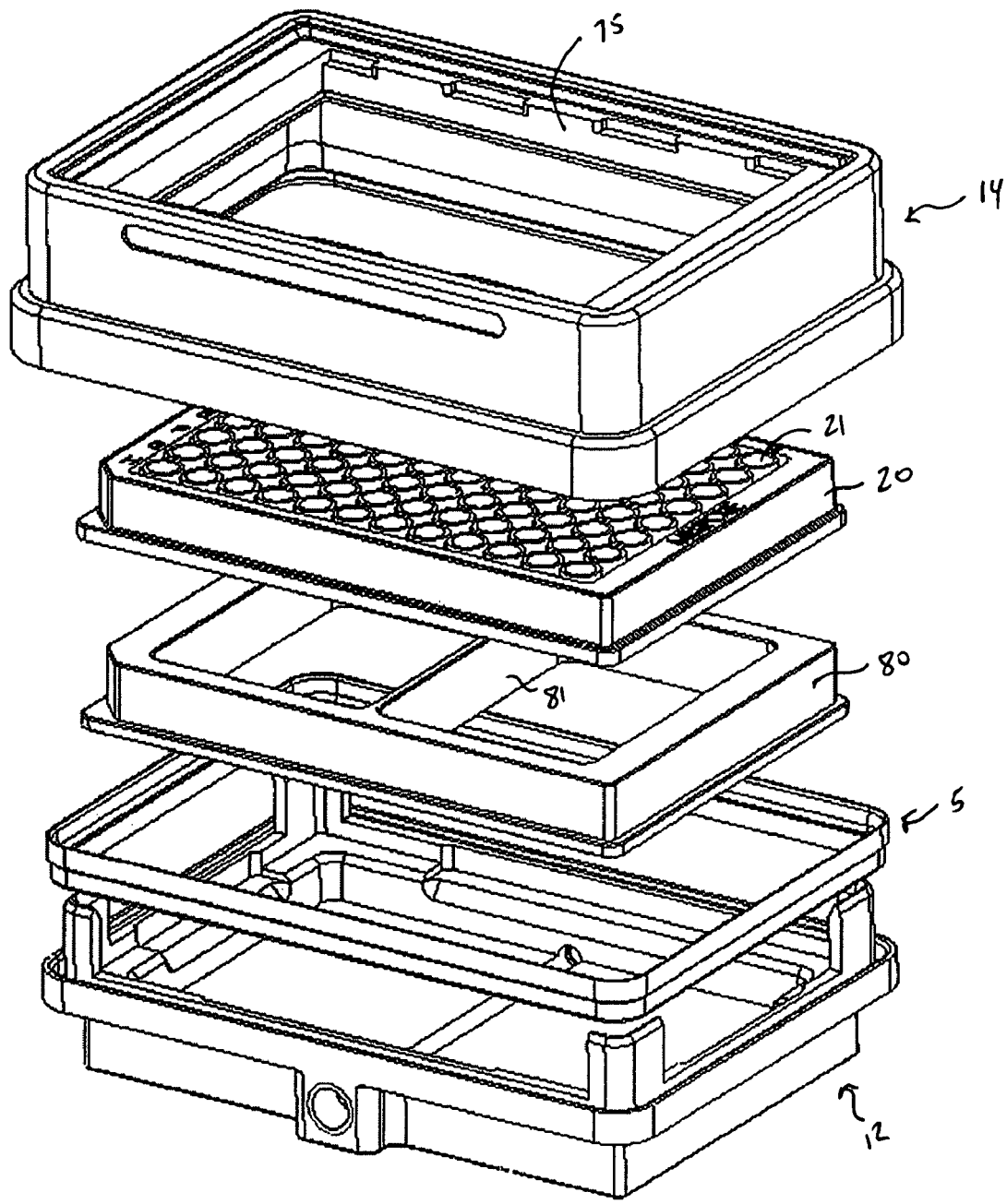
FIG. 3 is an exploded view of a manifold assembly in accordance with an alternative embodiment of the present invention.

Since the manifold design of the present invention is modular, different components can be positioned between the base and the collar, allowing a variety of applications to be performed. In one embodiment where the application requires a filter plate 20, but does not require a collection plate 22, a spacer or removable support 80 can replace the collection plate thereby maintaining the unit stack height (FIG. 3). The spacer or removable support 80 positions the filter plate 20 in the proper x-and y-axis orientation so that robotics can deliver sample to the wells 21 of the filter plate 20. It also positions the filter plate 20 at the proper stack height so that the collar 14 can seal to the base 12 and plate 20 simultaneously upon the application of vacuum. Accordingly, preferably the spacer or support 80 is dimensioned similar to the collection plate 20, as shown. In the embodiment shown, the spacer or support 80 includes a central beam 81 (positioned so as to not interfere with the operation of the filter plate) to help support the filter plate 20.

The top seal gasket 75 on the collar 14 can be used to create a seal when it is desired to carry out a quick wash procedure by placing the filter plate on top of the collar 14 rather than inside the manifold assembly. Indeed, this gasket can accept a variety of support structures for use with unique applications, such as a MULTISCREEN® Underdrain support grid commercially available from Millipore Corporation.

Figure 7:
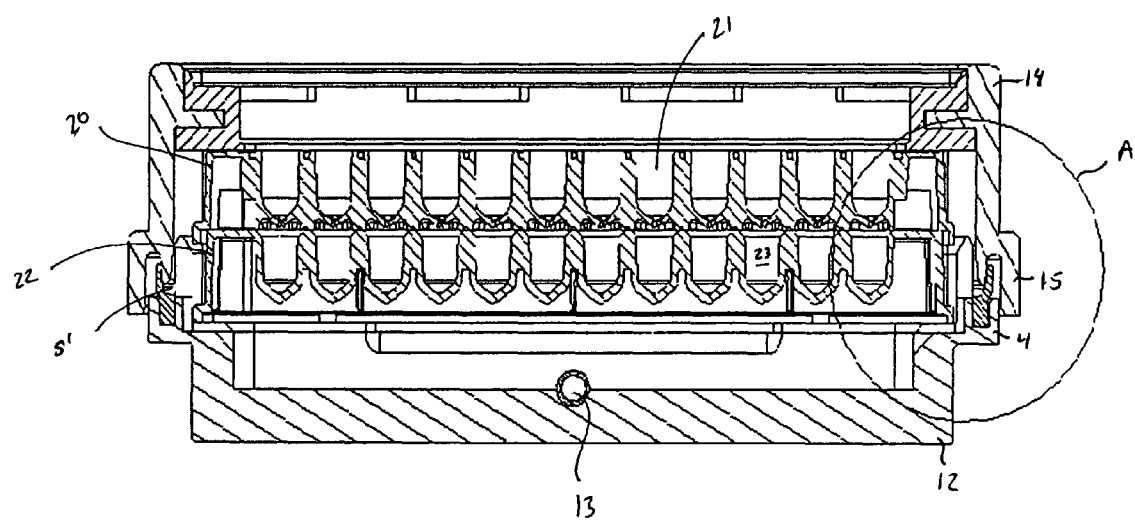
FIG. 7 is a cross-sectional view of the manifold assembly with a bottom gasket in accordance with an embodiment of the present invention.
Figure 8:
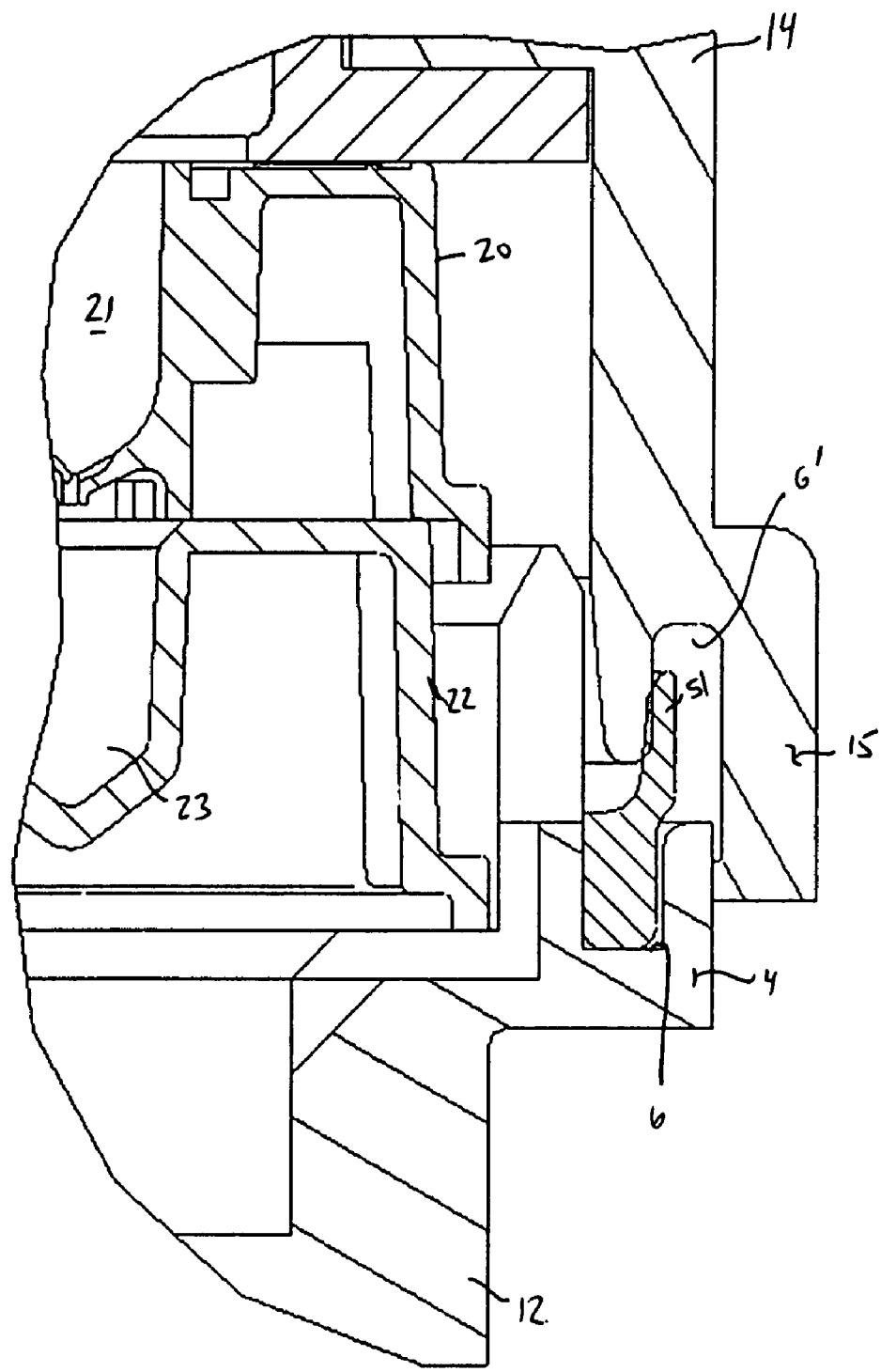
FIG. 8 is a cross-sectional view of Detail A of FIG. 7.

FIGS. 7 and 8 illustrate one embodiment of a bottom gasket 5'. In this embodiment, the gasket 5' is positioned in the groove 6 in base 12 as best seen in FIG. 8. It includes a wiper portion 51 that extends above the groove 6 and into recess 6' formed in skirt 15 of the collar 14 as shown. The height of the wiper portion 51 and its position in the recess 6' allows for some variability in the positioning of the collar 14 and base 12 (and thus variability in the stack height of the components contained between the collar and base) without sacrificing the integrity of the seal.

Figure 4A:
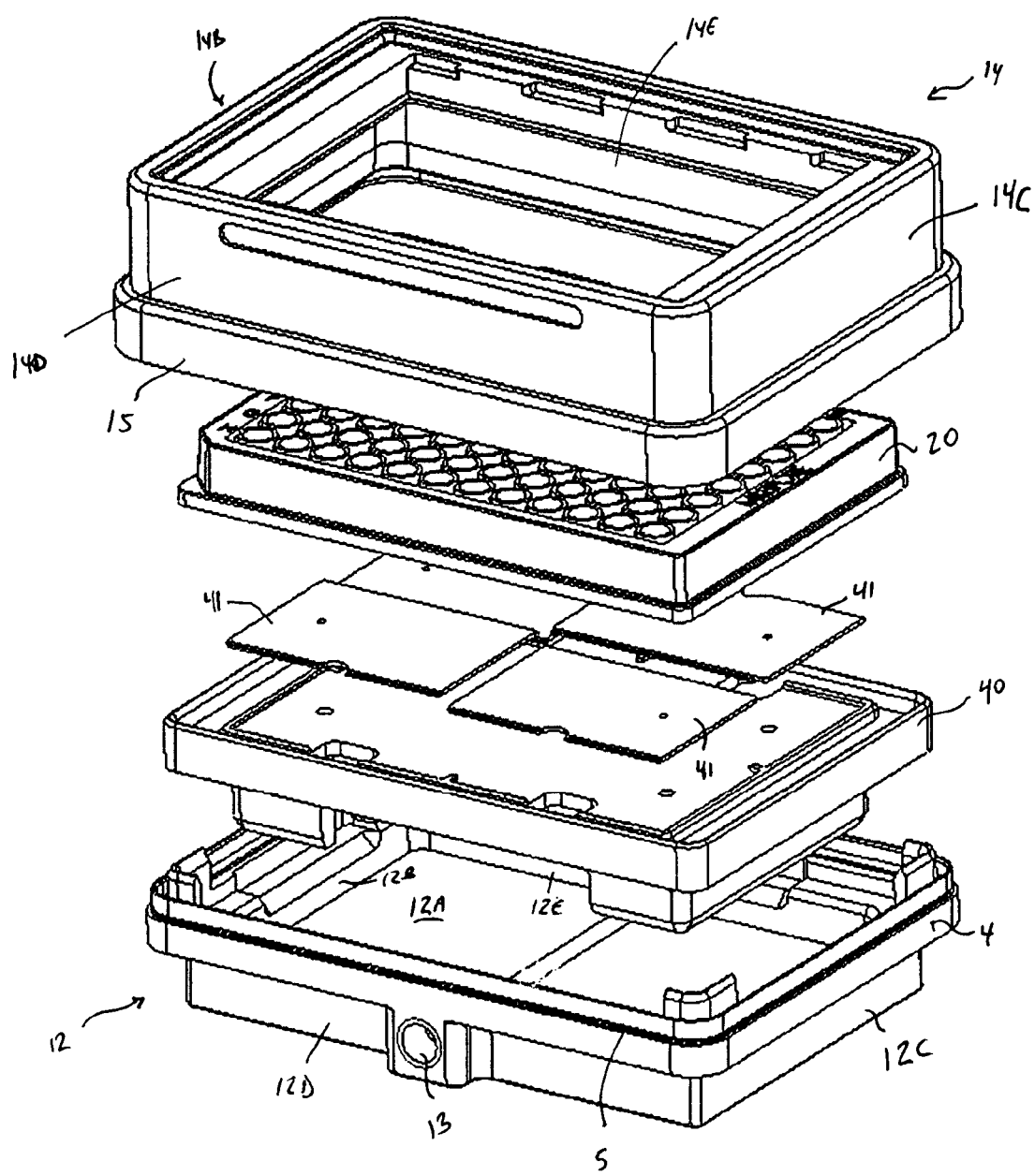
FIGS. 4A and 4B are exploded views of a manifold assembly in accordance with another embodiment of the present invention.
Figure 4B:
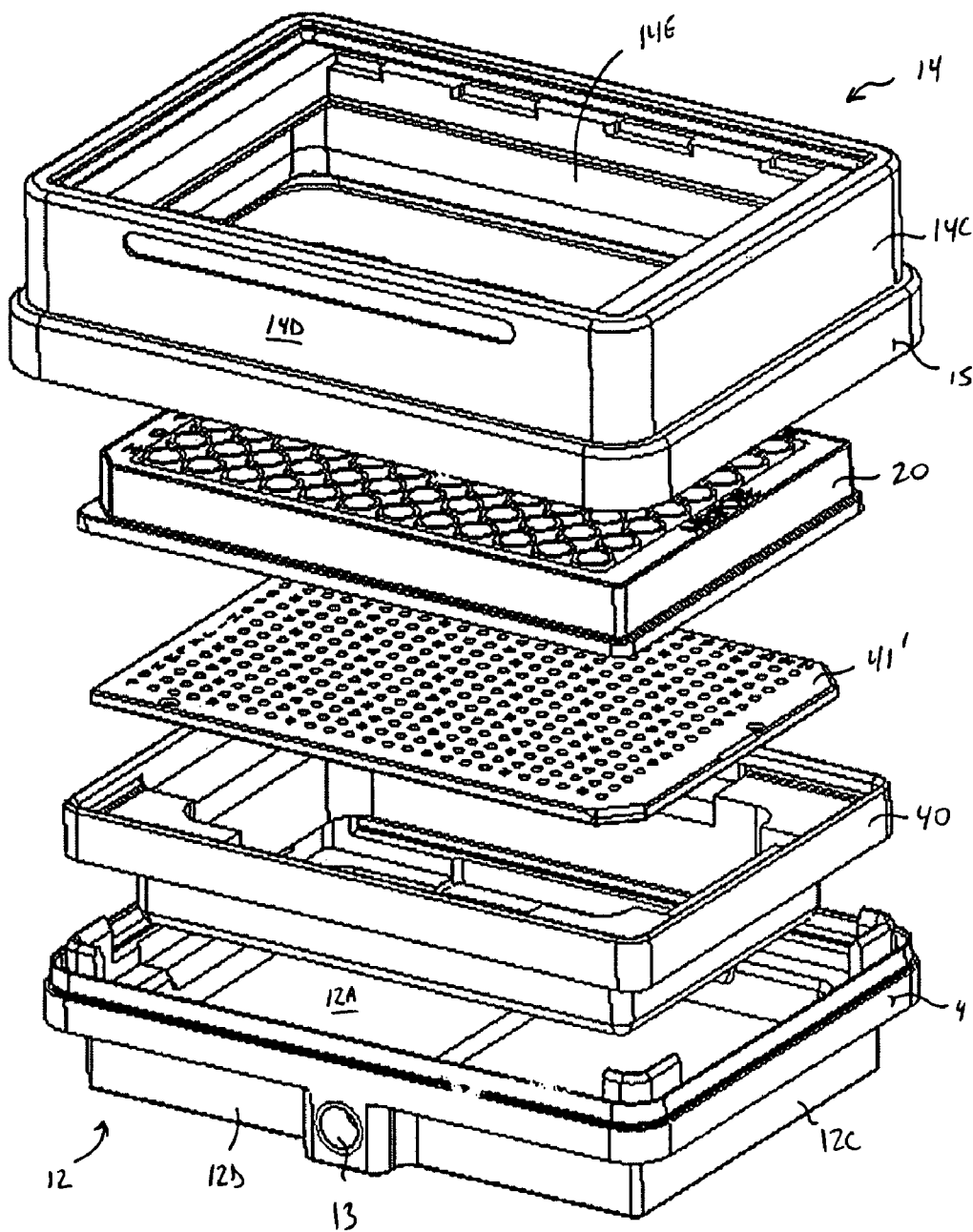

FIGS. 4A and 4B illustrate a further embodiment of the manifold of the present invention. This embodiment is useful for the direct transferring of elutants from filter plate 20 to one or more MALDI targets. Specifically, sample preparation prior to analysis by MALDI-TOF Mass Spectrometry often involves desalting and concentration of samples (e.g., peptides). Simultaneous preparation and analysis of multiple samples is often desirable, and can be carried out using the manifold assembly of the present invention. Accordingly, instead of the collection plate 21 of the embodiment of FIG. 1, or the support tray of the embodiment of FIG. 3, a target tray 40 is used. The design of the target tray 40 is not particularly limited, and will depend upon the configuration of the target(s) chosen. The tray 40 can hold one or more targets. For example, in the FIG. 4A embodiment, four MALDI targets 41 commercially available from Applera Corporation are used. Alternatively, as shown in FIG. 4B, a single target 41' such as a MALDI target commercially available from Bruker Daltonics can be used. The target tray 40 is positioned under the spouts of each well in the filter plate 20, with the correct stack height enabling the collar 14 to seal against the base 12 as before. As in the embodiments of FIGS. 1 and 3, the application of vacuum (e.g., the transition from atmospheric pressure to a different pressure) does not result in any z-axis movement of the operative component, which in this case is the filter plate stacked on top of the MALDI target(s).

In each of these embodiments, the stack height is critical to the sealing of the assembly. If a deep well filter plate were used, for example, a taller collar 14 and/or base 12, or an extension with appropriately located additional sealing gaskets, can be used, to insure the seal between the top of the plate and the flange on the base 12. The components of the stacked unit (e.g., the filter plate 20 and collection plate 22, or the filter plate 20, target 41 and target tray 40) do not move independently of one another, since they are positioned in stacked relationship on the base and any movement is limited to the collar. As a result, their relative position remains constant regardless of whether the assembly is under vacuum, thereby allowing a liquid handler to be programmed to dispense to the unit, for example.

Figure 5:
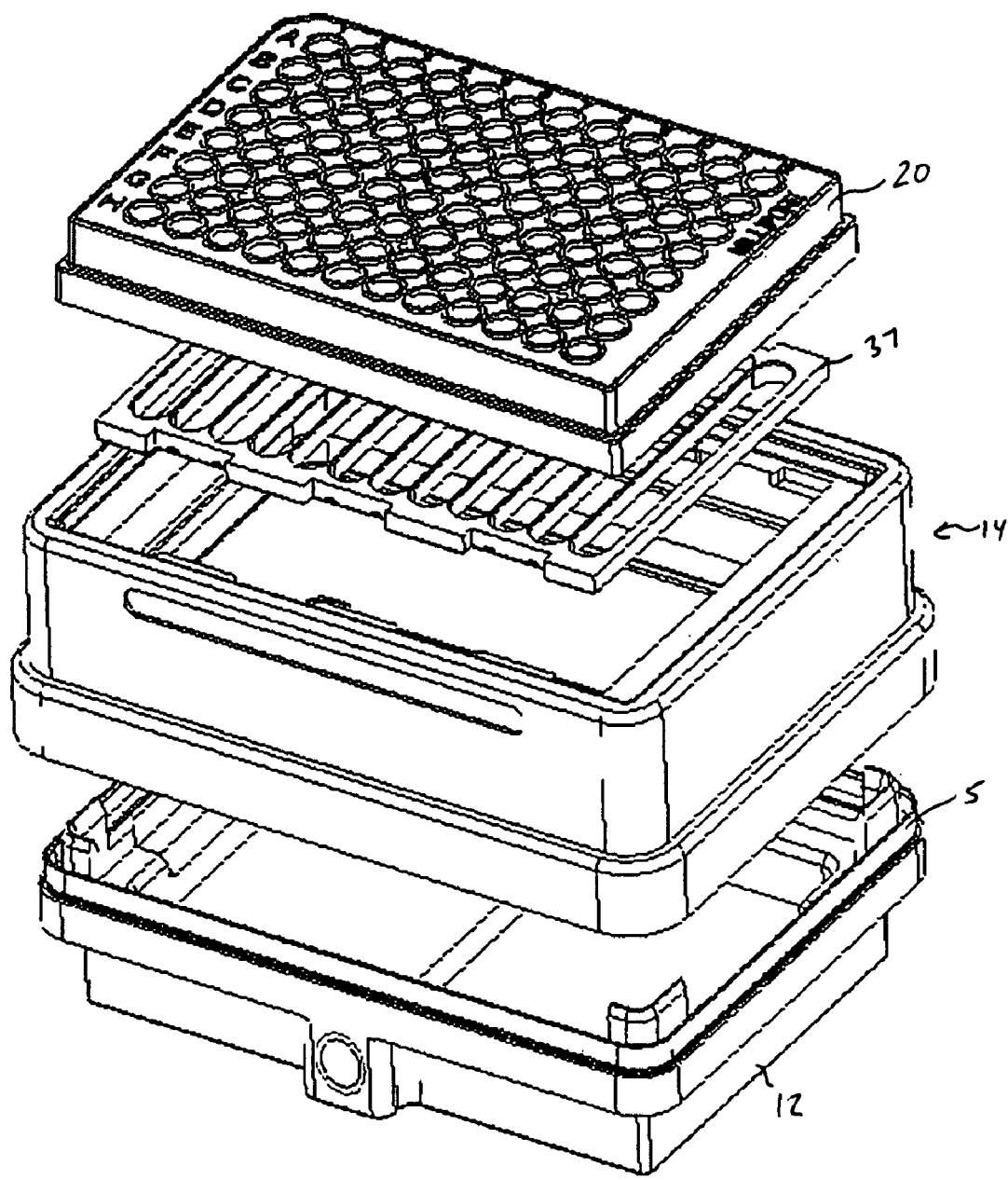
FIG. 5 is an exploded view of a multiwell plate sealed to the top of the manifold assembly in accordance with an embodiment of the present invention.
Figure 6:
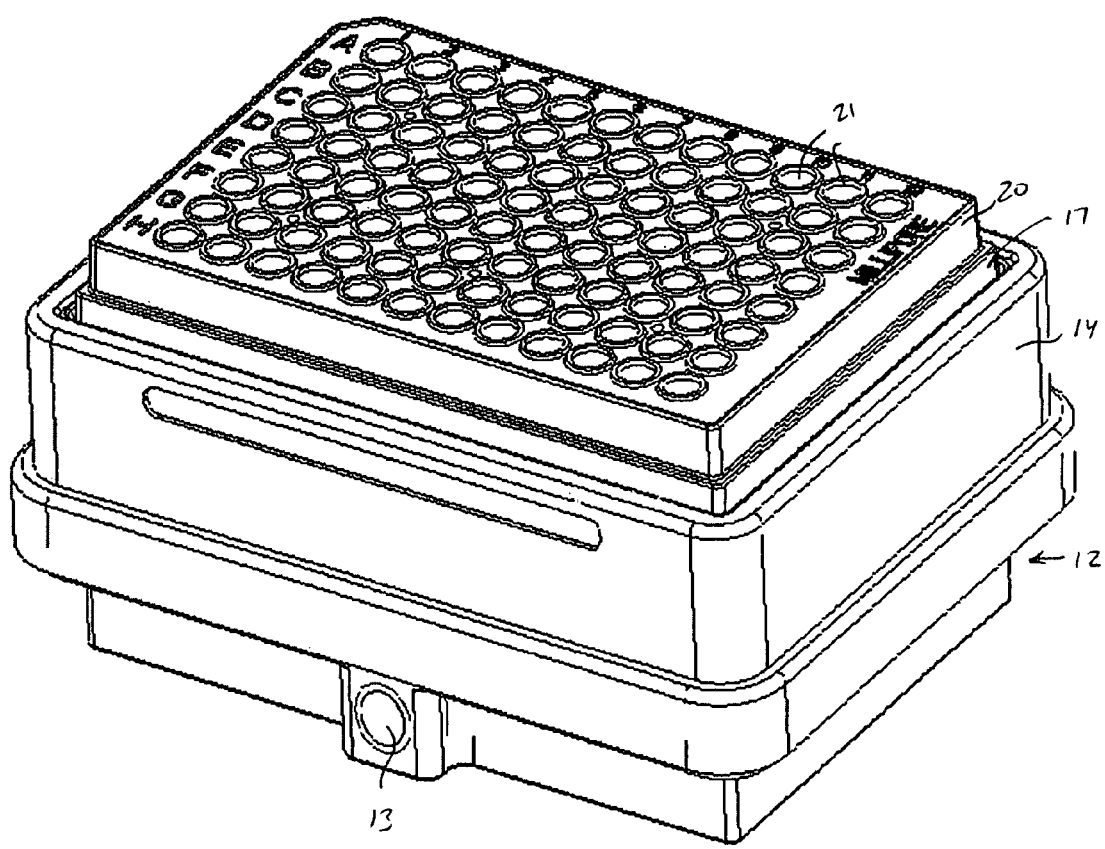
FIG. 6 is a perspective view of the assembly of FIG. 5.

FIGS. 5 and 6 illustrate the versatility of the manifold assembly of the present invention. In this embodiment, the collar 14 is place in sealing relationship with base 12, and a sample preparation device such as a multiwell plate 20 is placed on the top surface of the collar 14. An optional grid 37 can be positioned under the plate 20 to assist in supporting the plate 20. The plate 20 seals against the top gasket positioned in the collar 14. Accordingly, vacuum can be used as the driving force to filter sample through the plate 20. This enables a quick wash procedure without having to place the filter plate inside the manifold. The top gasket can accept a wide variety of support structures for use with unique applications, such as a 384 SEQ plate rib structure for drop removal and a Multiscreen Underdrain support grid, both commercially available from Millipore Corporation.

Since the modular design of the manifold assembly allows for various applications, the components of the present invention can be sold as a kit. For example, several different size collars can be provided in the kit in order to accommodate sample processing devices having different stack heights, such as where deep well filtration plates are used. Similarly, numerous different sample processing devices can be provided in the kit, including filtration plates with membranes of different functionality, collection plates, MALDI TOF targets, support grids, underdrains, washing inserts, etc.

What is claimed is:

1. A manifold assembly comprising:
   a collar;
   a base;
   a first sample processing device;
   a collection plate or target tray, stacked below said first sample processing device to form an integral stacked unit, said stacked unit positioned between said collar and said base, and said collar is positioned directly on the outer perimeter of said first sample processing device;
   a first seal between said collar and said base; and
   a second seal between said first sample processing device and said collar, positioned directly on the outer perimeter of said first sample processing device, wherein the collar comprises a skirt formed along a bottom periphery of a lateral wall such that the skirt positions over a peripheral portion of the base, and wherein said second seal is a gasket.

2. The manifold assembly of claim 1, wherein said first sample preparation device is a multiwell filtration plate.

3. The manifold assembly of claim 2, wherein said collection plate is a multiwell collection plate.

4. The manifold assembly of claim 2, wherein said target tray is a MALDI target.

5. The manifold of claim 1, wherein said collection plate is a removable support, and said first sample processing device comprises a plurality of wells, and the removable support comprises a plurality of openings and each opening is in register with a plurality of sample processing device wells.

6. The manifold assembly of claim 1, wherein said first seal is a gasket.

7. The manifold assembly of claim 1, wherein said first seal allows for variability in the height of said first device and the collection plate or target tray.

8. The manifold assembly of claim 1, wherein said collar has substantially vertical side walls, and wherein said first seal is created with a gasket positioned within said base, said sealing being along the substantially vertical side walls of said collar.

9. The manifold assembly of claim 1, further comprising a vacuum source, and wherein said base comprises a port for communication with said vacuum source.

10. The manifold assembly of claim 1, wherein the relative movement of said first and second devices of said integral stack unit is unaffected by the application of vacuum to said manifold.

11. A manifold assembly comprising:
    a collar;
    a base in sealing engagement with said collar, the base comprising an outer peripheral flange and a side wall which together form a peripheral groove and wherein a portion of the flange contacts a slot formed in the collar;
    a sample processing device; and
    a sealing gasket positioned between the sample processing device and the collar, wherein the sample processing device is positioned in a sealing engagement with said collar, and the collar comprises a skirt formed along a bottom periphery of a lateral wall such that the skirt positions over a peripheral portion of the base.

12. The manifold assembly of claim 11, further comprising a removable support positioned below said sample processing device.

13. The manifold assembly of claim 11, wherein said sample processing device is a multiwell filtration plate.

14. A method of applying vacuum to a manifold assembly, comprising:
    providing a vacuum source;
    providing a manifold assembly comprising a base having a peripheral portion and a port for communication with said vacuum source, a collar, a first sample, processing device having an outer perimeter wherein said collar is positioned on the outer perimeter of said first sample processing device, a second device stacked to form a sample processing unit, a seal positioned between said collar and said base, and a gasket positioned directly on the outer perimeter of said first sample processing device between said first sample processing device and said collar, wherein the collar comprises a skirt formed along a bottom periphery of a lateral wall such that the skirt positions over a peripheral portion of the base;
    positioning said collar on said base; and
    applying a vacuum to said manifold assembly with said vacuum source, whereby said collar is forced into sealing engagement with said base without causing movement of said sample processing unit.

15. The method of claim 14, wherein said first processing device is a filtration plate.

16. The method of claim 14, wherein said sealing engagement between said collar and said base is adaptable to different sample processing unit stack heights.

17. The method of claim 14, wherein functional inserts are positionable in said base.

18. The method of claim 14, wherein said second device is a sample processing device.

19. The method of claim 14, wherein said second device is a removable support.

20. The method of claim 14, wherein said second device is a MALDI target.

21. The manifold assembly of claim 14, wherein said seal and said gasket are a unitary seal.

22. A manifold assembly comprising:
    a collar;
    a base;
    a first sample processing device;
    a second device stacked below said first sample processing device to form an integral stacked unit preventing relative movement between said first and second devices, said stacked unit positioned between said collar and said base; and
    a unitary seal between said collar and said base and between said first sample processing device and said collar.

23. A manifold assembly comprising:
    a collar;
    a base;
    a first sample processing device comprising a multiwell filtration plate or a single well filtration device;
    a second device stacked below said first sample processing device to form an integral stacked unit preventing relative movement between said first and second devices, said stacked unit positioned between said collar and said base;
    a first seal between said collar and said base; and a second seal between said first sample processing device and said collar, wherein the collar comprises a skirt formed along a bottom periphery of a lateral wall such that the skirt positions over a peripheral portion of the base;

wherein the first sample processing device is seated recessed within the collar such that the top surface of the first sample processing device lies below the top surface of the collar.

24. A manifold assembly comprising:
a base;
a collar having a top surface;
a first seal between said collar and said base;
a first sample processing device having an outer perimeter, comprising a multiwell filtration plate or a single well filtration device, wherein the top surface of said collar is positioned on the outer perimeter of said first sample processing device;
a second seal positioned directly on the outer perimeter of said first sample processing device and located between said first sample processing device and the top surface of said collar, wherein the collar comprises a skirt formed along a bottom periphery of a lateral wall such that the skirt positions over a peripheral portion of the base, and wherein said second seal is a gasket.

25. The manifold of claim 24, further comprising a removable support located between said first sample processing device and said collar.

26. The manifold of claim 25, wherein said removable support comprises a support grid.

27. A manifold assembly comprising:
a collar;
a base;
a first sample processing device;
a collection plate or target tray, stacked below said first sample processing device to form an integral stacked unit, said stacked unit positioned between said collar and said base;
a first seal between said collar and said base; and
a second seal located between said first sample processing device and said collar, wherein said first seal and said second seal are a unitary seal, and wherein the collar comprises a skirt formed along a bottom periphery of a lateral wall such that the skirt positions over a peripheral portion of the base.

28. The manifold assembly of claim 27, wherein said first sample preparation device is a multiwell filtration plate.

29. The manifold assembly of claim 27, wherein said collection plate is a multiwell collection plate.

30. The manifold assembly of claim 28, wherein said second device is a MALDI target.

31. The manifold of claim 27, wherein said collection plate is a removable support, said first sample processing device comprises a plurality of wells, and said removable support comprises a plurality of openings and each opening is in register with a plurality of sample processing device wells.

32. The manifold assembly of claim 27, further comprising a vacuum source, and wherein said base comprises a port for communication with said vacuum source.

33. The manifold assembly of claim 27, wherein the relative movement of said first and second devices of said integral stack unit is unaffected by the application of vacuum to said manifold.

34. The manifold assembly of claim 22, further comprising a vacuum source, and wherein said base comprises a port for communication with said vacuum source.

35. The manifold assembly of claim 22, wherein the application of vacuum source to said manifold assembly does not affect the relative movement of said first and second devices of said integral stack unit.

36. The manifold assembly of claim 22, wherein said first sample processing device is a multiwell filtration plate.

37. The manifold assembly of claim 36, wherein said second device is a collection plate.

38. The manifold assembly of claim 36, wherein said second device is a MALDI target.

* * * * *